United States Patent Office
3,775,411
Patented Nov. 27, 1973

3,775,411
TRIAZINE DERIVATIVES AS ANTIOXIDANTS
Heimo Brunetti, Erlenstrasse 9, Reinach, Switzerland
No Drawing. Filed Oct. 26, 1971, Ser. No. 192,592
Claims priority, application Switzerland, Nov. 9, 1970,
16,548/70
Int. Cl. C07d 55/50
U.S. Cl. 260—248 CS        7 Claims

ABSTRACT OF THE DISCLOSURE

New 2,4 bis - (3,5 - di-tert.butyl-4-hydroxy-phenoxy)-s-triazines are stabilizers for organic materials. They are prepared by reacting the bis-[imino-carbonic acid-(3,5-di-tert.butyl-4-hydroxyphenyl)ester]-imide with a corresponding carboxylic acid chloride.

---

The present invention relates to new compounds, the method for their manufacture, their use for stabilising organic material against thermo-oxidative degradation and, as an industrial product, the organic material stabilised with their aid.

It has been found, surprisingly, that new compounds of the Formula I

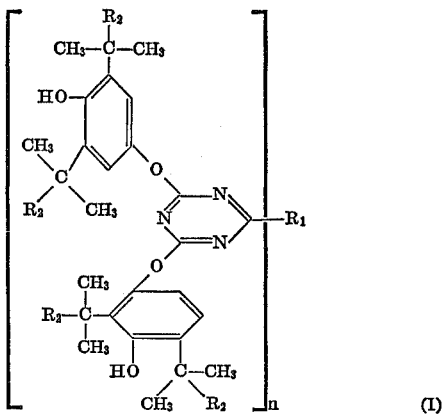

(I)

in which $R_1$ denotes hydrogen, alkyl with 1 to 17 carbon atoms, alkenyl with 2 to 4 carbon atoms, thiaalkyl with 3 to 20 carbon atoms, cyclohexyl, benzyl, alkylene with 4 to 8 carbon atoms or the radical

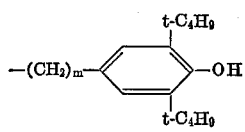

$R_2$ denotes methyl or ethyl and $m$ and $n$ denote 1 or 2, are very suitable for stabilising organic material against thermo-oxidative degradation.

Herein, the new compounds surprisingly show a better activity than the compounds previously known from Belgian patent specification 718,962, in which $R_1$ denotes an aryl group.

The new compounds of the Formula I can be manufactured if a compound of the Formula II

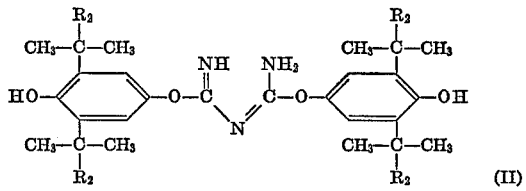

(II)

is reacted with a compound of the Formula III $$R_1(COCl)_n \quad (III)$$

in which Formulae II and III $R_1$, $R_2$ and $n$ have the above-mentioned meaning, in the presence of a base, and if $n$ denotes 1, approximately molar amounts of the compound of the Formula II are reacted or, if $n$ denotes 2, approximately double the molar amounts of the compound II are reacted, relative to the compound of the Formula III.

A tertiary amine, such as triethylamine, can for example be used as the base. The reaction is advantageously carried out in a solvent, for example hexane, toluene, ether or acetone.

Compounds of the Formula I, in which $R_1$ denotes hydrogen can be manufactured by reaction of a compound of the Formula II with orthoformic acid triethyl ester.

The compounds of the Formula I can also be obtained in a manner which is in itself known, by reaction of a compound of the Formula IV

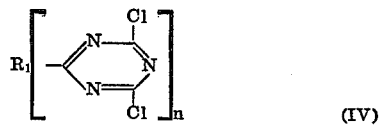

(IV)

with approximately 2 n mols of a compound of the Formula V

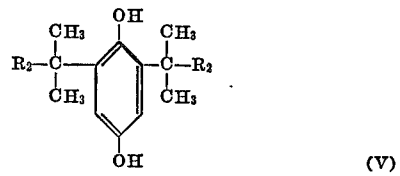

(V)

in which formulae $R_1$, $R_2$ and $n$ are defined as under Formula I, in the presence of a base.

In the Formula I, $R_1$ for example denotes an alkyl group with 1 to 17 carbon atoms, such as methyl, ethyl, propyl, butyl, pentyl, heptyl, iso-heptyl, nonyl, undecyl, pentadecyl or heptadecyl, an alkenyl group with 2 to 4 carbon atoms such as vinyl or 2-butenyl, a thiaalkyl group with 3 to 20 carbon atoms such as the methyl-, ethyl-, butyl-, octyl-, tert.-octyl-, dodecyl-, tert.-dodecyl- or octadecyl-thioethyl group or the butyl-, octyl-, dodecyl- or octadecyl-thiomethyl group or an alkylene group with 4 to 8 carbon atoms, such as the tetramethylene, hexamethylene or octamethylene group.

Preferred compounds of the Formula I are those in which $R_1$ denotes an alkyl group with 7 to 17 carbon atoms, a cyclohexyl group, a benzyl group, a thiaalkyl group with 5 to 14 carbon atoms, an alkylene group with 4 to 8 carbon atoms or the radicals

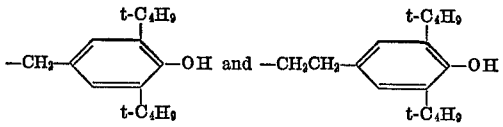

The compounds according to the invention protect organic materials, especially organic polymers, against thermo-oxidative degradation. Amongst the polymers which are protected by the compounds according to the invention there should be mentioned: polyolefines, preferably α-olefine polymers, such as polypropylene, optionally crosslinked polyethylene, polyisobutylene, polymethylbutene-1, polymethylpentene-1, polybutene-1, polyisoprene and polybutadiene; copolymers of the monomers on which the homopolymers mentioned are based, such as ethylene-propylene copolymers, propylene-butene-1 copolymers, propylene-isobutylene copolymers, styrene-butadiene copolymers, and terpolymers of ethylene and propylene with a diene, for example hexadiene, dicyclopentadiene or ethylidenenorbornene; mixtures of the abovementioned homopolymers, for example mixtures of polypropylene and polyethylene, polypropylene and polybutene-1, and polypropylene and polyisobutylene. Polypropylene, as well as its mixtures and the copolymers which contain propylene units, are at the same time preferred.

Further polyaddition compounds, such as copolymers and graft polymers of styrene and butadiene with acrylonitrile, acrylic and methacrylic acid esters and optionally with vinyl esters and vinyl chloride, or natural polymers, such as rubber, and polycondensation products such as polycarbonate, polyamides, polyesters, polyacetals and polyurethanes. High molecular monomeric substances, such as hydrocarbons, for example mineral oils; esters, for example animal or vegetable fats, oils or waxes, or oils and waxes based on synthetic esters.

The compounds of the Formula I are incorporated into the substrates at a concentration of 0.01 to 5% by weight, calculated relative to the material to be stabilised. Preferably, 0.05 to 1.5, and particularly preferably 0.1 to 0.8% by weight of the compounds, calculated relative to the material to be stabilised, are incorporated into the latter.

The incorporation into polymers can take place before or after polymerisation, or before or after shaping, for example by mixing the compounds of the Formula I, and optionally further additives, into the melt or solution of the polymers in accordance with the methods customary in the art. It can also be effected by applying the dissolved or dispersed compounds to the polymer, where necessary with subsequent evaporation of the solvent.

As further additives together with which the compounds according to the invention can be employed, there may be mentioned:

(1) Antioxidants of the aminoaryl and hydroxyaryl series: Amongst the latter, the sterically hindered phenol compounds should be mentioned, for example: 2,2'-thiobis - (4 - methyl - 6 - tert.-butylphenol), 4,4'-thio-bis- (3 - methyl - 6 - tert.-butylphenol), 2,2' - methylene-bis - (4 - methyl - 6 - tert.-butylphenol), 2,2' - methylene-bis - (4 - ethyl - 6 - tert.-butylphenol), 4,4' - methylene-bis - (2 - methyl - 6 - tert.-butylphenol), 4,4' - butylidene-bis - (3 - methyl - 6 - tert.-butylphenol), 2,2'-methylene-bis - [4 - methyl - 6 - (α-methylcyclohexyl)-phenol], 2,6 - di - (2 - hydroxy - 3 - tert.-butyl - 5 - methyl-benzyl) - 4 - methyl-phenol, 2,6- di-tert.-butyl - 4 - methyl-phenol, 1,1,3 - tris - 2 - methyl - (4 - hydroxy - 5 - tert.-butylphenyl)-butane, 1,3,5 - trimethyl - 2,4,6 - tris-(3,5-di-tert.-butyl - 4 - hydroxy-benzyl)-benzene, esters of β- 4 - hydroxy - 3,5 - di-tert.-butylphenyl-propionic acid with monohydric or polyhydric alcohols, such as methanol, ethanol, octadecanol, hexanediol, nonanediol, thiodiethylene glycol, trimethylhexanediol, trimethylolethane or pentaerythritol, 2,4 - bis-octylmercapto - 6 - (4-hydroxy-3,5 - di-tert.-butylanilino)-s-triazine, 2,4 - bis-(4-hydroxy-3,5 - di-tert.-butylphenoxy) - 6 - octylmercapto-s-triazine, 1,1 - bis - (4 - hydroxy - 2 - methyl - 5 - tert.-butyl-phenyl) - 3 - dodecyl-mercapto-butane, 4 - hydroxy-3,5-di-tert.-butylbenzyl-phosphonic acid esters, such as the di-methyl, diethyl or dioctadecyl ester, (3 - methyl - 4 - hydroxy - 5 - tert.-butylbenzyl)-malonic acid dioctadecyl ester, S-(3,5 - dimethyl - 4 - hydroxybenzyl)-thioglycollic acid octadecyl ester, and esters of bis-(3,5-di-tert.-butyl-ester, the dioctadecyl ester and the 2-dodecylmercapto-4 - hydroxybenzyl)-malonic acid such as the didodecyl ethyl ester.

Amongst the aminoaryl derivatives, aniline and naphthylamine derivatives as well as their heterocyclic derivatives should be mentioned, for example phenyl-1-naphthylamine, phenyl - 2 - naphthylamine, N,N'-diphenyl-p-phenylenediamine, N,N' - di - 2 - naphthyl-p-phenylenediamine, N,N' - di-sec.butyl-p-phenylenediamine, 6-ethoxy - 2,2,4 - trimethyl - 1,2 - dihydroquinoline, 6-dodecyl - 2,2,4 - trimethyl - 1,2 - dihydroquinoline, mono-octyliminodibenzyl and dioctyliminodibenzyl and polymerised 2,2,4 - trimethyl - 1,2 - dihydroquinoline, though in the case of the combined use of the compounds according to the invention with the abovementioned amine compounds the stabilised polymer has less good colour properties because of the tendency to discolouration of the amine compounds.

(2) UV-absorbers and light protection agents, such as:

(a) 2-(2'-hydroxyphenyl)-benztriazoles, for example the 5'-methyl, 3',5'-di-tert.butyl, 5'-tert.butyl, 5-chloro-3', 5'-di-tert.-butyl, 5-chloro-3'-tert.butyl-5'-methyl, 3',5'-di-tert.amyl, 3'-methyl-5'-β-carbomethoxyethyl and 5-chloro-3',5'-di-tert.amyl derivative.

(b) 2,4-bis-(2'-hydroxyphenyl)-6-alkyl-s-triazines, for example the 6-ethyl or 6-undecyl derivative.

(c) 2-hydroxy-benzophenones, for example the 4-hydroxy, 4-methoxy, 4-octoxy, 4-decyloxy, 4-dodecyloxy, 4,2',4'-trihydroxy or 2'-hydroxy-4,4'-dimethoxy derivative.

(d) 1,3-bis-(2'-hydroxy-benzoyl)-benzenes, for example 1,3-bis-(2'-hydroxy-4'-hexyloxy-benzoyl)-benzene, 1,3-bis-(2'-hydroxy-4'-octoxy-benzoyl)-benzene and 1,3-bis-(2'-hydroxy-4'-dodecyloxy-benzoyl)-benzene.

(e) Aryl esters of optionally substituted benzoic acids, for example phenyl salicylate, octylphenylsalicylate, benzoylresorcinol, dibenzoylresorcinol, 3,5-di-tert.butyl-4-hydroxybenzoic acid 2,4-di-tert.butyl-phenyl ester or octadecyl ester.

(f) Acrylates, for example α-cyano-β,β-diphenylacrylic acid ethyl ester or isooctyl ester, α-carbomethoxy-cinnamic acid methyl ester, α-cyano-β-methyl-p-methoxy-cinnamic acid methyl ester and butyl ester and N-(β-carbomethoxy-vinyl)-2-methyl-indoline.

(g) Nickel compounds, for example nickel complexes of 2,2'-thiobis-(4-tert.octylphenol), such as the 1:1- and 1:2-complex, optionally with other ligands such as n-butylamine, nickel complexes of bis - (4 - tert.octylphenyl)-sulphone, such as the 2:1-complex, optionally with other ligands such as 2-ethylcaproic acid, nickel dibutyldithiocarbamate, nickel salts or 4-hydroxy-3,5-di-tert.butylbenzyl-phosphonic acid monoalkyl esters, such as of the methyl, ethyl or butyl ester, or the nickel complex of 2-hydroxy-4-methyl-phenyl-undecyl-ketonoxime.

(h) Oxalic acid diamides, for example 4,4'-di-octyloxy-oxanilide, 2,2'-di-octyloxy-5,5'-di-tert.-butyl - oxanilide and 2,2'-di-dodecyloxy-5,5'-di-tert.-butyl-oxanilide.

(3) Phosphites, such as triphenylphosphite, diphenylalkylphosphites, phenyldialkylphosphites, trinonylphenylphosphites, trilaurylphosphite, trioctadecylphosphite, 3,9-di-isodecyloxy-2,4,8,10-tetraoxa-3,9-diphosphaspiro-(5,5)-undecane and tri - (4 - hydroxy-3,5-di-tert.butylphenyl)-phosphite.

(4) Nucleating agents, such as 4-tert.butylbenzoic acid, adipic acid and diphenylacetic acid.

(5) Compounds which destroy peroxides, such as esters of β-thiopropionic acid, for example the lauryl, stearyl, myristyl or tridecyl ester. Salts of 2-mercaptobenzimidazole, for example the zinc salt, and diphenylthiourea.

(6) Metal deactivators, such as oxanilide, dicarboxylic acid dihydrazides, dicarboxylic acid bis-phenylhydrazides, salicylic acid hydrazide, N-salicyloyl - N' - salicylidene-hydrazine, bis - salicyloyl - dicarboxylic acid dihydrazides, bis-acylated dicarboxylic acid dihydrazides and salicyloyl-hydrazinotriazines.

(7) Other additives such as antistatic agents, flame-proofing agents, asbestos, glass fibres, kaolin, talc, blowing agents, carbon black, plasticisers, dyeing auxiliaries, dyestuffs, pigments, vulcanisation accelerators and other chemicals customarily used in the rubber industry, agents for lowering the pour point, corrosion protection agents and rust protection agents, dispersing agents and anti-foaming agents.

The invention is explained in more detail in the examples which follow. |+| in the formulae of the examples denotes tertiary-butyl.

EXAMPLE 1

Manufacture of the compounds of the Formula I

Stage 1: 111 g. of 3,5-di-tert.butyl-4-hydroxyphenyl-cyanate are first introduced into 500 ml. of hexane. Ammonia gas is passed over the surface of the stirred solution, at 0–5° C., until the precipitate which has formed no longer increases. The bis-[imino-carbonic acid-(3,5-di-tert.butyl-4-hydroxyphenyl)-ester]-imide is filtered off and dried in vacuo. 128 g. of melting point 188–190° C. (Kofler bench) are thus obtained.

Stage 2: 10.2 g. of bis-[imino-carbonic acid-(3,5-di-tert.butyl-4-hydroxyphenyl)-ester]-imide are suspended in 40 ml. of toluene. 4.8 g. of lauric acid chloride are added dropwise at 0–5° C. over the course of 15 minutes, followed by 2.2 g. of triethylamine added dropwise. The temperature is raised to 50° C. and maintained thereat for one hour, the mixture is filtered, the residue is washed with toluene, and the entire filtrate is evaporated in vacuo. The residue is dissolved in petroleum ether. On cooling the solution to ~0° C., the product crystallises out. It is filtered off, rinsed with cold petroleum ether and recrystallised from hexane. 10.5 g. of 2,4-bis-(3,5-di-tert.butyl-4-hydroxy-phenoxy)-6-undecyl-s-triazine (Stabiliser No. 8) of melting point 58–60° C. are thus obtained.

If the lauric acid chloride in the preceding example is replaced by an equivalent amount of the corresponding acid chloride, the stabilisers indicated in Table 1 are obtained under the same reaction conditions. Working up has to be varied slightly from case to case, and this is recorded very briefly in the table.

Stabiliser No. 1 was obtained if, in the above method of manufacture, the lauric acid chloride was replaced by an excess amount of orthoformic acid triethyl ester and the triethylamine was omitted.

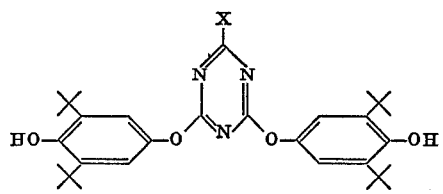

TABLE 1

| Stabiliser No. | X | Working up | Melting point, °C. |
|---|---|---|---|
| 1 | H | Recrystallised from hexane | 214 |
| 2 | —CH₃ | do | 186 |
| 3 | —C₂H₅ | Recrystallised from ligroin | 180 |
| 4 | —C₅H₁₁ | do | 180 |
| 5 | —C₇H₁₅ | do | 163 |
| 6 | —CH₂—CH(CH₃)—CH₂—C(CH₃)₂—CH₃ | do | 207 |
| 7 | —C₉H₁₉ | Chromatographed (toluene/silica gel) | ~50 |
| 9 | —C₁₇H₃₅ | Chromatographed (toluene/silica gel) and recrystallised from acetonitrile | <50 |
| 10 | —CH=CH₂ | Recrystallised from ligroin | 196 |
| 11 | —C₆H₁₁ (cyclohexyl-H) | Recrystallised from methanol/water | 205 |
| 12 | —CH₂—C₆H₅ | Recrystallised from isopropanol | 165 |
| 13 | —CH₂—S—C₄H₉ | Recrystallised from hexane | 172 |
| 14 | —CH₂CH₂—S—C₄H₉ | do | 132 |
| 15 | —CH₂CH₂—S—C₈H₁₇—(n) | Chromatographed (toluene/silica gel) | 98 |
| 16 | —CH₂CH₂—S—C₈H₁₇(tert.) | do | 63–65 |
| 17 | —CH₂CH₂—S—C₁₂H₂₅ | do | 113 |
| 18 | —CH₂CH₂—S—C₁₈H₃₇ | Recrystallised from acetonitrile (cooling with CO₂) | (¹) |
| 19 | —CH₂—C₆H₂(+)₂—OH | Recrystallised from ligroin | 226 |
| 20 | —CH₂CH₂—C₆H₂(+)₂—OH | do | 185 |
| 21 | —(CH₂)₄—² | Recrystallised from toluene | 206 |
| 22 | —(CH₂)₈—² | Recrystallised from ligroin | 157 |

¹ Below room temperature (oil).
² In this case, 1 mol of imide was reacted with ½ mol of dicarboxylic acid chloride and 1 mol of triethylamine.

Analogously, reaction of bis-[imino-carbonic acid-(3,5-di-tert.amyl - 4 - hydroxyphenyl)-ester]imide with cyclohexane-carboxylic acid chloride yields 2,4-bis-(3,5-di-tert.-amyl-4-hydroxy-phenoxy)-6-cyclohexyl-s-triazine of melting point 143–144° C.

In the use examples, the following two compounds from Belgian Pat. 718,962 were also tested, for comparison:

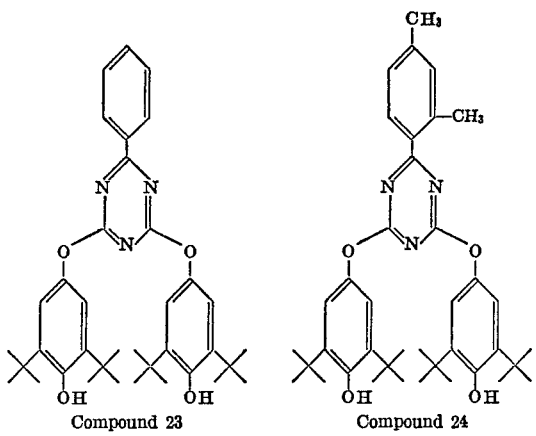

Compound 23    Compound 24

EXAMPLE 2

Stabilisation of polypropylene (1 mm. sheets)

(a) Manufacture of the test specimens: 100 parts of polypropylene (melt index 3.2) are kneaded in a Brabender plastograph for 10 minutes at 200° C. with the stabilisers listed in Tables 2 and 3 below. This ensures homogeneous distribution of the stabilisers. The composition thus obtained is subsequently pressed in a platen press at 260° C. platen temperature to give 1 mm. thick sheets from which strips 1 cm. wide and 17 cm. long are punched.

(b) Test: The effectiveness of the stabilisers added to the test sheets is tested by heat ageing the sheets in a circulating air oven at 135° C. and 149° C. The incipient visible decomposition of the test specimen is regarded as the end point. For results, see Tables 2 and 3.

TABLE 2

|  | Time up to decomposition, in days at— | |
|---|---|---|
|  | 135° C. | 149° C. |
| Without stabilizer | 1 | <1 |
| 0.2% of stabilizer No. 8 | 162 | 35 |
| 0.2% of stabilizer No. 9 | 158 | 31 |
| 0.2% of stabilizer No. 20 | 176 | 53 |
| 0.2% of stabilizer No. 21 | 175 | 45 |
| .2% of stabilizer No. 22 | 173 | 45 |
| Comparison, from Belgian Patent No. 718,962 | | |
| 0.2% of stabilizer No. 23 | 141 | 21 |

TABLE 3

|  | Time up to decomposition, in days at— | |
|---|---|---|
|  | 135° C. | 149° C. |
| 0.1% of Compound No. 9 plus 0.3% DLTDP[1] | 178 | 40 |
| 0.1% of Compound No. 20 plus 0.3% DLTDP | 172 | 45 |
| 0.1% of Compound No. 21 plus 0.3% DLTDP | 167 | 39 |
| 0.1% of Compound No. 22 plus 0.3% DLTDP | 167 | 44 |
| Comparison, from Belgian Patent No. 718,962 | | |
| 0.1% of Compound No. 23 plus 0.3% DLTDP | 163 | 37 |

[1] "DLTDP"=Dilaurylthiodipropionate.

EXAMPLE 3

Stabilisation of polypropylene (25μ chips)

Shavings (chips) of 25μ thickness are cut from the 1 mm. thick test sheets described in Example 2, with the aid of a microtome. These chips are clamped between grids of stainless steel and the sample carriers thus obtained are suspended in a circulating air oven and subjected to ageing at 135° C. or 147° C. The time after which, on lightly tapping the grids, degraded polypropylene drops out in a powdered form (checked 1–2× daily) is taken as the end point.

For results, see Tables 4 and 5.

TABLE 4

|  | Time up to decomposition, in hours at— | |
|---|---|---|
|  | 135° C. | 147° C. |
| Without stabiliser | 20 | 10 |
| 0.2% of stabiliser No. 5 | 330 | 140 |
| 0.2% of stabiliser No. 7 | 504 | 96 |
| 0.2% of stabiliser No. 8 | 695 | 160 |
| 0.2% of stabiliser No. 11 | 330 | 96 |
| 0.2% of stabiliser No. 12 | 330 | 72 |
| 0.2% of stabiliser No. 13 | 405 | 140 |
| 0.2% of stabiliser No. 14 | 330 | 96 |
| 0.2% of stabiliser No. 15 | 430 | 95 |
| 0.2% of stabiliser No. 16 | 430 | 95 |
| 0.2% of stabiliser No. 17 | 480 | 95 |
| 0.2% of stabiliser No. 19 | 550 | 240 |
| Comparison, from Belgian Patent No. 718,962 | | |
| 0.2% of stabiliser No. 24 | 275 | 60 |

TABLE 5

|  | Time up to decomposition, in hours at— | |
|---|---|---|
|  | 135° C. | 147° C. |
| 0.1% of Compound No. 5 plus 0.3% DLTDP[1] | 380 | 36 |
| 0.1% of Compound No. 7 plus 0.3% DLTDP | 672 | 96 |
| 0.1% of Compound No. 8 plus 0.3% DLTDP | 672 | 160 |
| 0.1% of Compound No. 11 plus 0.3% DLTDP | 330 | 96 |
| 0.1% of Compound No. 12 plus 0.3% DLTDP | 380 | 96 |
| 0.1% of Compound No. 13 plus 0.3% DLTDP | 430 | 140 |
| 0.1% of Compound No. 16 plus 0.3% DLTDP | 380 | 95 |
| 0.1% of Compound No. 17 plus 0.3% DLTDP | 280 | 70 |
| 0.1% of Compound No. 19 plus 0.3% DLTDP | 450 | 165 |
| Comparison, from Belgian Patent No. 718,962 | | |
| 0.1% of Compound No. 24 plus 0.3% DLTDP | 275 | 65 |

[1] "DLTDP"=Dilaurylthiodipropionate.

I claim:
1. A compound of the Formula I

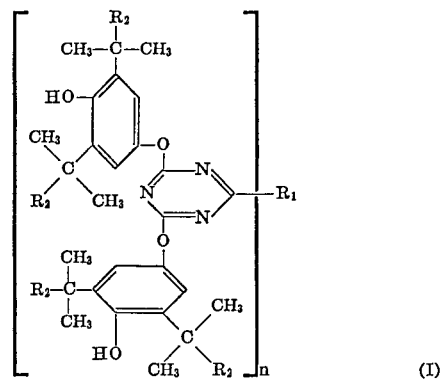

in which $R_1$ is hydrogen, alkyl with 1 to 17 carbon atoms, alkenyl with 2 to 4 carbon atoms, thiaalkyl with 3 to 20 carbon atoms, cyclohexyl, benzyl, alkylene with 4 to 8 carbon atoms or the radical

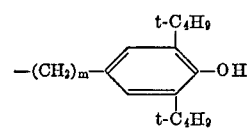

$R_2$ is methyl or ethyl and $m$ and $n$ are 1 or 2.

2. Compound according to claim 1, of the formula

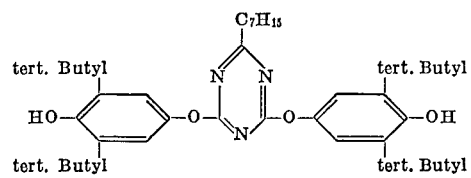

3. A compound according to claim 1, of the formula

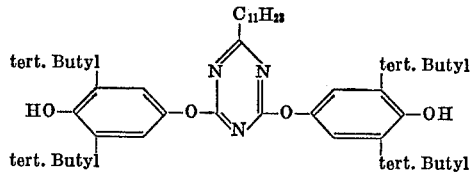

4. A compound according to claim 1, of the formula

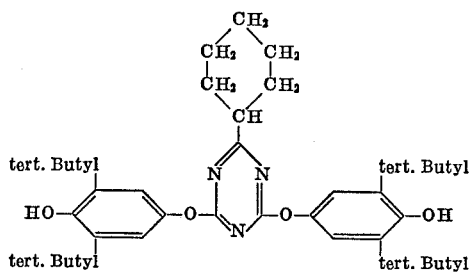

5. A compound according to claim 1, of the formula

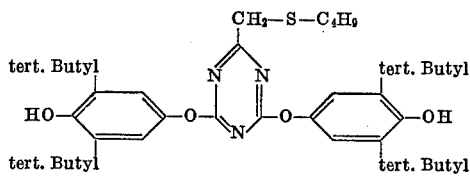

6. A compound according to claim 1, of the formula

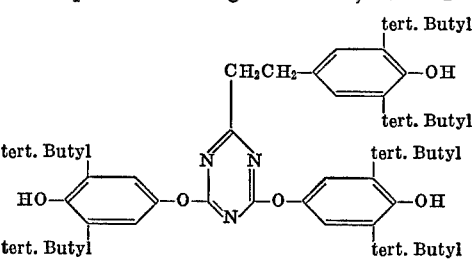

7. Process for the manufacture of a compound of claim 1, characterised in that a compound of the Formula II

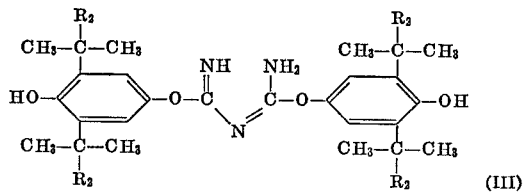

is reacted, in the presence of a base, with a compound of the Formula III $$R_1(COCl)_n \quad (III)$$

wherein, in the Formulae II and III, $R_1$ is hydrogen, alkyl with 1 to 17 carbon atoms, alkenyl with 2 to 4 carbon atoms, thiaalkyl with 3 to 20 carbon atoms, cyclohexyl, benzyl, alkylene with 4 to 8 carbon atoms or the radical

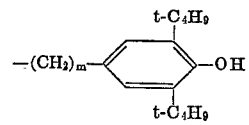

$R_2$ is methyl or ethyl and $m$ and $n$ are 1 or 2, and that if $n$ is 1, approximately molar amounts of the compound of the Formula II are reacted or, if $n$ is 2, approximately double the molar amounts of the compound II are reacted, relative to the compound of the Formula III.

References Cited

UNITED STATES PATENTS 3,652,464   3/1972   Grindahl et al. _____ 260—248

JOHN M. FORD, Primary Examiner

U.S. Cl. X.R.

260—45.8 N; 99—163